April 23, 1957     T. F. BROWN     2,790,113
PANELBOARDS
Filed May 31, 1952     5 Sheets-Sheet 1
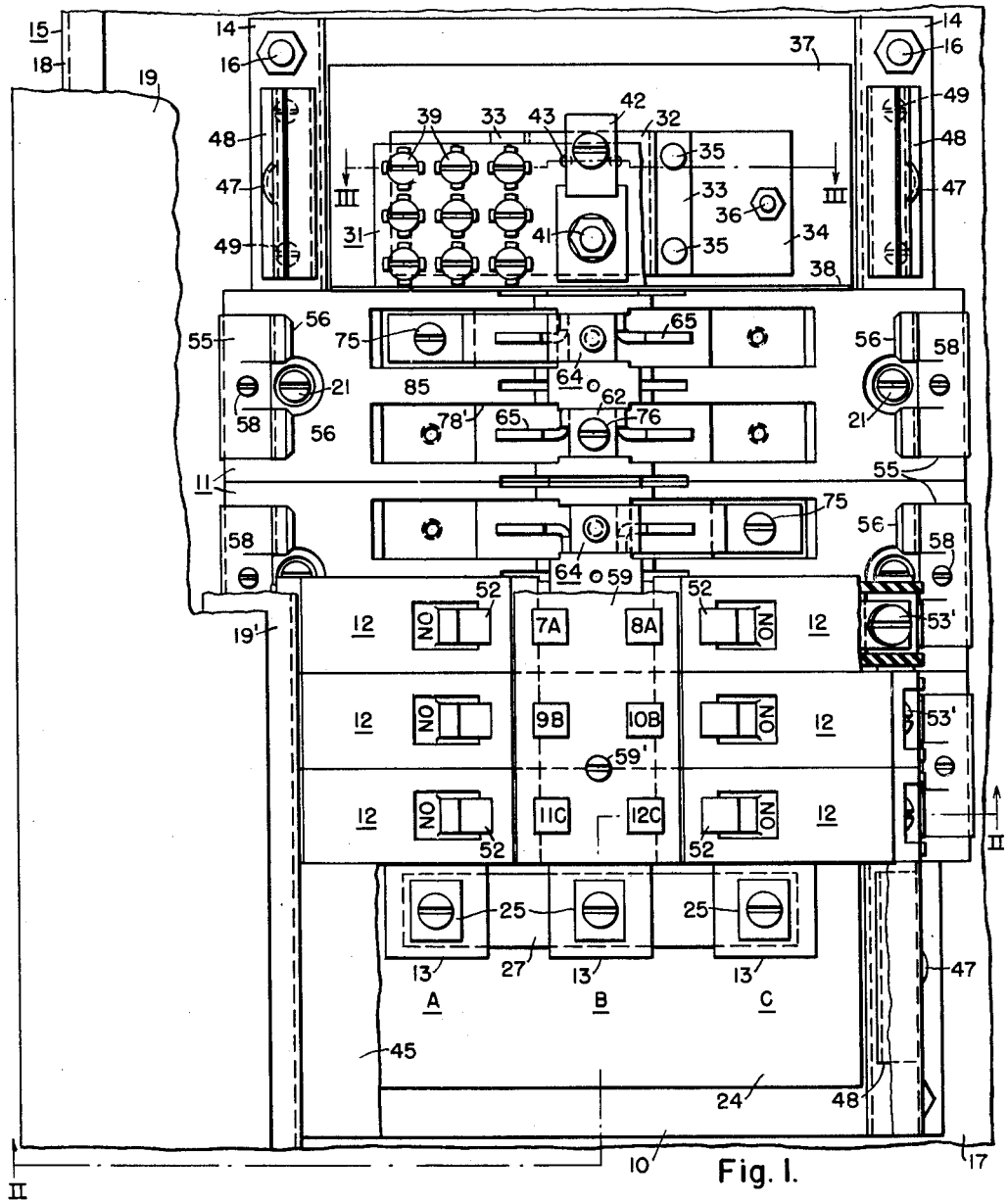
Fig. I.
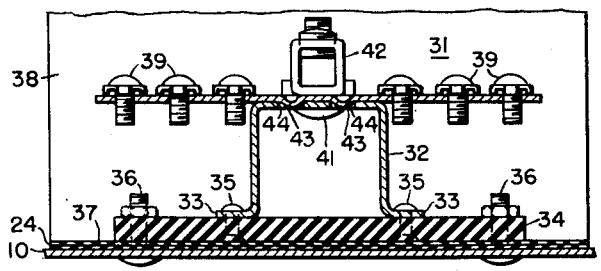
Fig. 3.
INVENTOR
Thomas F. Brown.
BY
Ralph H. Swingle
ATTORNEY April 23, 1957     T. F. BROWN     2,790,113
PANELBOARDS
Filed May 31, 1952     5 Sheets-Sheet 2

WITNESSES:
Robert C. Baird

INVENTOR
Thomas F. Brown.
BY Ralph H. Swingle
ATTORNEY

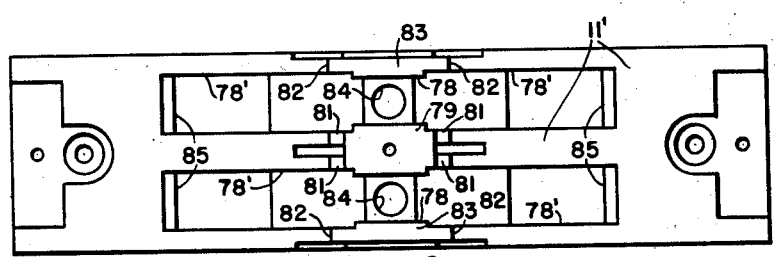
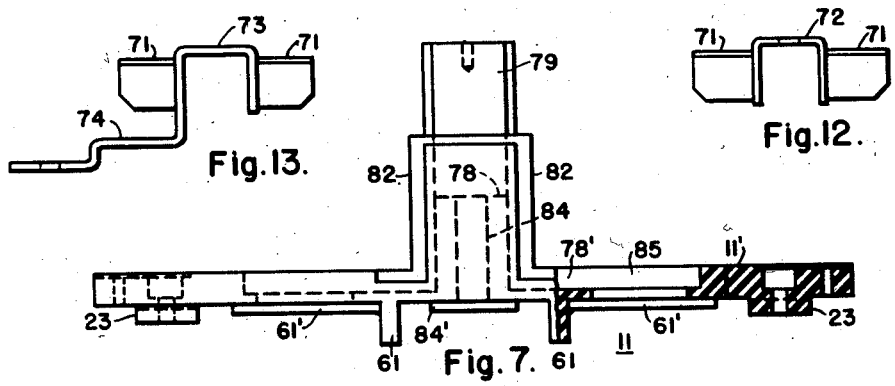
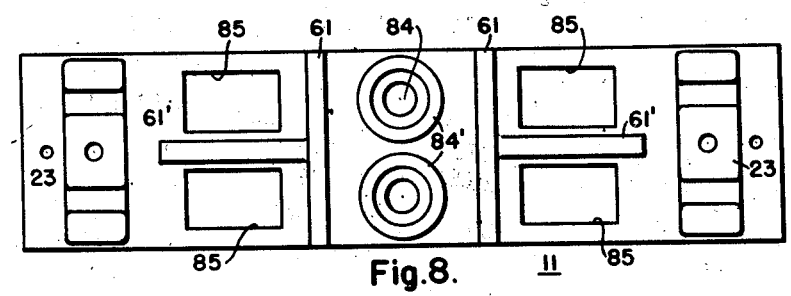
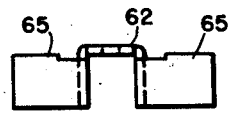
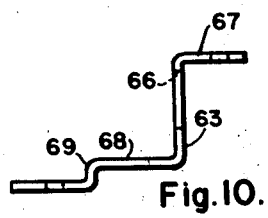
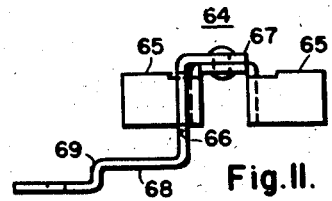
INVENTOR
Thomas F. Brown.

INVENTOR
Thomas F. Brown.
BY
ATTORNEY

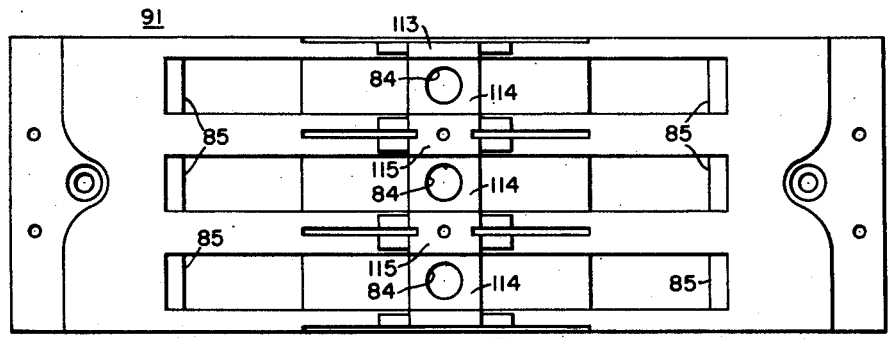
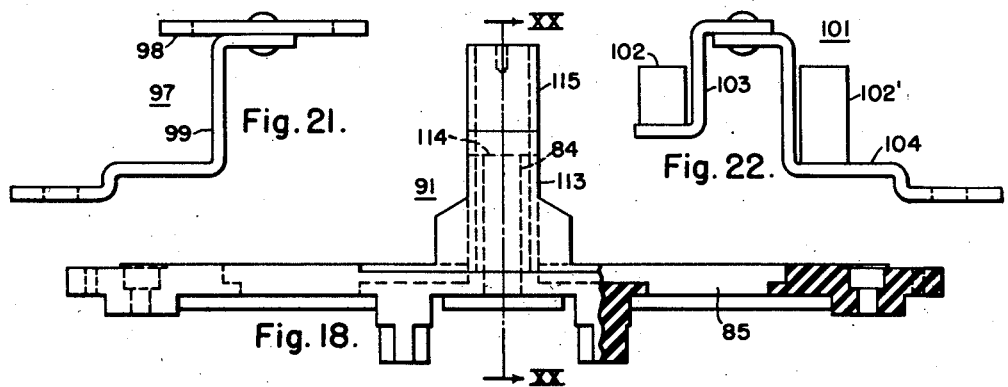
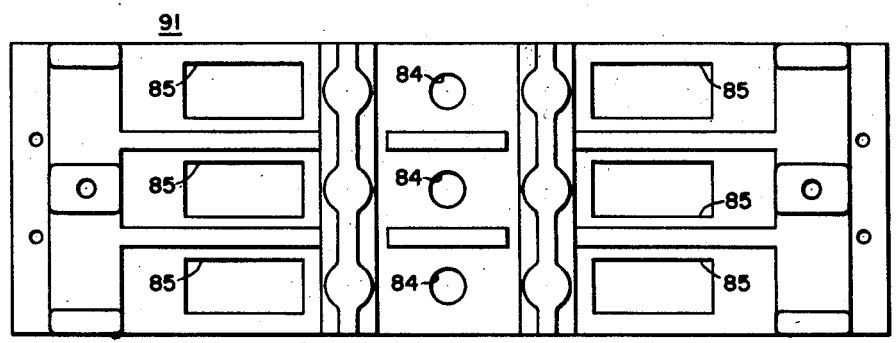
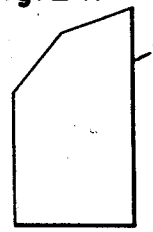
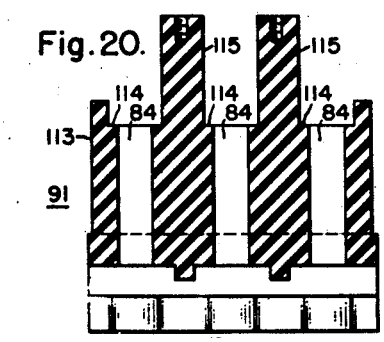

United States Patent Office 2,790,113
Patented Apr. 23, 1957

2,790,113

PANELBOARDS

Thomas F. Brown, Belleville, N. J., assignor to Westinghouse Electric Corporation, East Pittsburgh, Pa., a corporation of Pennsylvania Application May 31, 1952, Serial No. 290,943

35 Claims. (Cl. 317—119)

My invention relates, generally, to panelboards and more particularly to panelboards of the type in which a plurality of circuit interrupter devices are mounted in a cabinet suitable for installation in or on the wall of a building.

In order to save materials in the construction, and space in the installation, of such panelboards it is desirable to reduce the size of the panelboards. However, the maintaining of adequate air spacing and creepage distances over insulation between the energized parts of a panelboard becomes a problem when attempting to reduce the size. This is particularly true in panelboards having sequence phasing where the adjacent branch circuit devices are connected alternately to bus bars of different polarity or phase, in contrast with panelboards having group phasing where adjacent devices are all at the same potential. Another problem is the retention of flexibility in making circuit connections to permit the phase loads to be balanced.

An object of my invention is to provide a panelboard which shall be very compact in structure and which may be economically manufactured and assembled from a plurality of identical standard units to make panelboards of various sizes and types.

A more specific object of my invention is to provide sufficient creepage distance and air spacing between energized parts in a very compact panelboard structure to enable the structure to withstand the required voltage tests.

Another object of my invention is to provide a panelboard in which the load or branch distribution circuits may be readily and safely connected to any desired bus bar in the panelboard, even though adjacent poles of the branch distribution circuits are connected to different phases.

A further object of my invention is to provide a panelboard in which the circuit interrupter devices may be readily installed and replaced.

Still another object of my invention is to provide simple and improved connectors for connecting the interrupter devices to the bus bars.

A still further object of my invention is to improve and simplify the structure for mounting a neutral bar in a panelboard.

It is also an object of my invention to provide a base block of molded insulating material for receiving a plurality of circuit breakers, with the block so shaped as to permit sequence phasing in a very compact structure.

Another object of my invention is to provide a construction which will discourage the unauthorized removal of the interrupter units from a panelboard by the users.

Other objects of my invention will be explained fully hereinafter or will be apparent to those skilled in the art.

In accordance with one embodiment of my invention a plurality of individual circuit breaker units are mounted on a common sub-base which may be molded from insulating material and mounted on a flanged metal pan which may be adjustably mounted in a metal cabinet. The number of sub-bases and breakers depends upon the number of circuits to be controlled. Each breaker unit is enclosed by a separate housing and the housings are disposed side-by-side in two parallel rows on the sub-bases. Three parallel bus bars are disposed on the bottom side of the sub-bases, the two outer bars being underneath the breaker units and the center bar being below and between the breaker units. Oppositely disposed breakers may be connected to the center bus bar by a generally U-shaped connector or to either one of the outer bars by a cross connector comprising a U-shaped member and a member having an offset portion which extends underneath a breaker unit housing. The connectors are disposed in recesses in a post formed integrally with the base and disposed in the space between the two rows of breaker units.

For a better understanding of the nature and objects of the invention, reference may be had to the following detailed description, taken in conjunction with the accompanying drawings, in which:

Figure 1 is a view, in plan, of a portion of a panelboard structure embodying the principal features of the invention, certain parts being broken away for clearness;

Fig. 3 is a view in section, taken along the line III—III in Fig. 1;

Fig. 6 is a view, in plan, of the base shown in Fig. 5;

Fig. 7 is a view, in side elevation, of the base, certain parts being broken away to show construction features;

Fig. 8 is a bottom plan view of the base;

Fig. 9 is a view, in side elevation, of one of the connectors utilized for connecting the interrupter units to the middle bus bar;

Fig. 10 is a view, in side elevation, of part of another connector;

Fig. 11 is a view, in side elevation, of the complete connector for connecting the interrupter units to an outer bus bar;

Fig. 12 is a view, similar to Fig. 9, of a modified connector;

Fig. 13 is a view, similar to Fig. 11, of a modified connector;

Fig. 17 is a view, in plan, of one of the bases utilized in the structure shown in Fig. 14;

Fig. 18 is a view, in side elevation, of the base shown in Fig. 17;

Fig. 19 is a bottom plan view of the base;

Fig. 20 is a view, in section, taken along the line XX—XX in Fig. 18;

Figs. 21, 22 and 23 are views, in side elevation, of modified connectors, and

Fig. 24 is a view, in side elevation, of a barrier which may be utilized in the panelboard structure.

Figure 2:
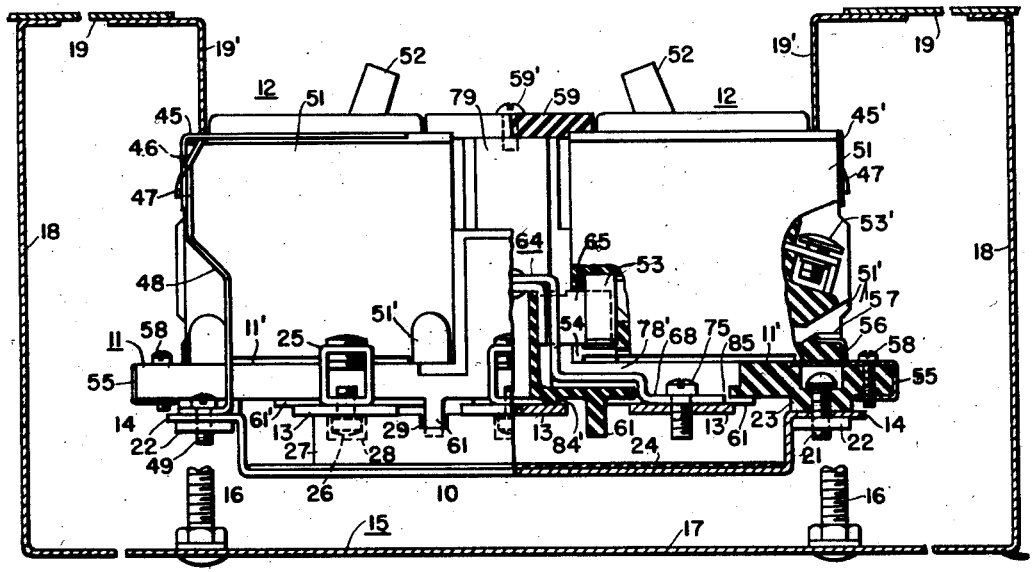
Fig. 2 is a view, partly in section and partly in elevation, the section being taken along the line II—II in Fig. 1, certain parts being broken away to show details of construction.

Referring to the drawings, and particularly to Figs. 1 to 11, the structure shown therein comprises a mounting plate or pan 10, a plurality of unitary bases 11 on which are mounted a plurality of circuit interrupter units 12 and a plurality of bus bars 13 for conducting current to the interrupter units 12. The interrupter units 12 may be automatic circuit breakers, preferably of the plug-in type. However, circuit breakers of other types may be utilized if desired, as will be explained more fully hereinafter.

As shown, the mounting pan 10 may be of a channel shape having outwardly extending flanges 14. The pan 10 may be mounted in a cabinet 15 by means of adjustable bolts 16, one of which is disposed near each corner of the cabinet. The cabinet 15 comprises a back wall 17 having integrally formed flanged side walls 18 and a detachable cover or panel trim 19 having a return or downwardly extending flange 19' for engaging the outer edges of the circuit interrupter units 12. The trim 19 may be attached to the flange on the side wall 18 by screws (not shown) and may be provided with a hinged door over the circuit breaker handles, if desired.

As shown most clearly in Figs. 1 and 2, each base 11 may be removably attached to the flanges 14 of the pan 10 by means of screws or bolts 21 which are threaded into square nuts 22 underneath the flanges. The square nuts 22 engage the side of the pan to prevent them from turning. The screws 21 extend through downwardly extending lugs 23 on the bottom of the base which, together with the upwardly extending sides of the pan 10, provide a predetermined clearance between the bus bars 13 and the bottom of the pan 10. If desired, an insulating sheet 24 may be provided on the bottom of the pan to prevent arcing between the bus bars and the pan 10.

The bus bars 13 are mounted on the bottom side of the insulating bases 11 and are secured to the bases in a manner which will be described more fully hereinafter. A line terminal lug or connector 25 is attached to each bus bar 13 near one end by a screw 26. The connectors 25 are provided for connecting power supply conductors to the bus bars 13. The invention has been illustrated by showing a three-phase four-wire panelboard having three bus bars 13 beneath the bases 11, but the same parts may be used for a single-phase three-wire or an Edison three-wire panelboard by merely omitting either the center bus bar or one of the outside bus bars and making all of the connections to the remaining bus bars. Preferably the center bus bar is left out and the opposite pairs of breakers are connected alternately to the two bus bars under the two rows of breakers.

In order to support the ends of the bus bars 13 to prevent them from being bent downwardly when pressure is applied while making connections to the terminal connectors 25, a generally rectangular insulating member 27 is disposed between the bus bars and the pan 10 underneath the connectors 25 and transversely of the bus bars. The member 27 is retained in position by the heads of the screws 26 which are disposed in recesses 28 provided in the member 27. Transverse grooves 29 are provided in the member 27 to increase the creepage distance along the surface of the member between bus bars 13.

A neutral bar 31 is mounted on the pan 10 at the top of the panelboard structure for making the usual neutral connections in a single-phase three-wire system, where only two bus bars are used, or in a three-phase four-wire system as illustrated. As shown most clearly in Fig. 3, the neutral bar 31 is supported by a U-shaped bracket 32 having flanges 33 which are attached to an insulating member 34 by rivets 35. The member 34 may be attached to the pan 10 by bolts 36. An angle-shaped sheet of insulating material having one leg 37 disposed underneath the member 34 and the other leg 38 disposed between the bar 31 and the upper end of the bus bars 13 may be provided for insulating the neutral bar 31 from the pan 10 and from bus bars 13.

In order to increase the number of terminal screws 39 which may be provided on the bar 31 for making neutral connections, the bar 31 is attached to the bracket 32 by a single bolt 41 which also functions to attach a neutral terminal lug 42 to the bar 31. The bar 31 is prevented from turning on the bracket 32 by projections 43 which extend into holes 44 in the bracket 32. Thus, the space usually required for separate bolts for attaching the neutral bar to its support is made available for terminal screws 39. The terminal lug 42 may be utilized for connecting the neutral wire of the system to the neutral bar 31. By having the neutral bar 31 supported on the bracket 32 at a distance from the pan 10 there is sufficient flashover distance from the neutral bar to the grounded pan, even though the neutral bar is made deeper to accommodate more rows of terminal screws 39 and extends above the upper edge of the insulating sheet 37, as is the case where the panelboard has more circuits than the small 12-pole panelboard illustrated on the drawing.

A removable cover plate 45 is provided over the terminal connectors 25. The cover plate may be of the snap-on type, having openings 46 in its end flanges for receiving ears 47 on brackets 48 which support the cover plate. The brackets 48 may be attached to the flange 14 on the pan 10 by means of bolts 49 which are threaded into square nuts 22. A similar cover plate 45', Fig. 2, may be provided over the neutral bar 31. It may be snapped onto brackets 48 in the same manner as the plate 45.

In the present modification of the invention each base 11 supports four branch circuit breaker units 12. The breaker units are each mounted on main surface portions 11' of the base 11 at opposite sides thereof. As shown most clearly in Fig. 2, each one of the circuit breaker units is individually enclosed by a housing 51 and is provided with an operating handle 52 which projects from an opening in the top of the housing 51.

As shown, the breaker units are of the plug-in type, each unit having plug-in contact jaws 53 for frictionally engaging a plug-in contact blade on a connector to connect the breaker unit to a bus bar, as will be explained more fully hereinafter. The contact jaws 53 are recessed in the housing 51 which has an opening 54 in one corner to provide access to the contact jaws. The opening 54 extends part way along the bottom and part way along one end of the housing. The side walls of the breaker units thus form barriers between the jaws 53, and the ends of the contact blades therein, of adjacent breakers which may be of different polarity.

The load terminal connector 53' of each breaker is recessed in the outer end of the breaker, so that the side walls of the breakers act as barriers and give ample electrical clearance between adjacent breakers of different polarity even though the breakers are so narrow that there would not be adequate insulation if the connectors were not so recessed.

There is a vent opening 51' at the outer end of each breaker beneath the terminal connector 53' and through which the ionized arc gases generated when overloads or short circuits are interrupted may be safely exhausted into the wiring gutter of the panelboard without coming in contact with the live bus bars or connectors, hereinafter described, as might be the case if the vents were in the inner ends or bottoms of the breakers.

The outer end of each one of the housings 51 may be held in position on a base 11 by means of a spring clip 55. The clip 55 is of a U-shape and has an L-shaped extension 56, one leg of which enters a slot 57 in the outer end of the housing 51 when the breaker unit is installed on the base 11. As shown, each clip 55 is provided with two arms 56 for retaining two breaker units in position. Each clip 55 extends around the end of the base and may be attached to the base 11 by means of a screw 58 which may be of the self-tapping type. The engagement of the clips 55 with the outer ends of the interrupter units at the mounting slots 57 provides a slip-off fastening, detachably securing the interrupter units in the panelboard so as to be readily removed or replaced.

As shown most clearly in Fig. 2, the inner ends of the breaker units are held in position by cover plates 59 which overlap the inner ends of the breaker housings 51. The cover plates are attached to the bases 11 by screws 59' threaded into extensions 79 thereon as described hereinafter.

As explained hereinbefore, it is desirable to provide a compact panelboard. One way of reducing the size of prior panelboards is to utilize circuit breaker units having smaller overall dimensions. At the present time circuit breakers of the type shown herein which have a width of 1 inch or less and a length of 3 inches or less are available. Thus, the breaker units may be spaced on 1 inch centers to reduce the length or height of the panelboard and the width may be reduced by taking advantage of the shorter breaker units.

However, good engineering practice requires that the distance between energized parts of different polarity shall not be less than a certain amount. For example, for 120/240 volt panelboards, the flash-over distance through air should not be less than three-fourths of an inch, and for the same voltage the creepage distance over insulating surfaces should not be less than one and one-fourth inches. Therefore, in prior panelboards it was necessary to so space the breaker units as to maintain the required distances, to provide special barriers between energized parts of different polarity, to use group phasing rather than sequence phasing, or to mold the bus bars and connectors in a unitary block of insulation with the attendant loss of flexibility in assembling various sizes and modifications of the panelboard.

In order to provide a compact panelboard, the bus bars 13 are spaced relatively close together on the bottom side of the insulating bases 11, and the circuit breaker units are disposed side-by-side in two parallel rows on top of the bases with a relatively narrow intervening space between the inner ends of the housing 51. This space between the two rows is not substantially greater than the width of one of the bus bars and is much less than the length of the individual breaker units. Thus, as shown in Fig. 2, the middle bus bar is disposed under the space between the breaker units and each outer bus bar is disposed underneath one row of breaker units.

Downwardly extending ridges 61 are provided on the bottoms of the bases 11 to define passages extending transversely across the width of the bases for the bus bars and to permit the bus bars to be placed close together and still maintain the desired creepage distance between bus bars. Bus bar supporting ridges or bosses 61' extend at right angles to the ridges 61, and circular ridges or bosses 84' are provided around the openings 84. The bosses 61' and 84' support the bus bars 13 away from the main surface of the bottom of the insulating sub-bases 11 and give increased creepage distance permitting wider bus bars to be used for higher current rating panelboards with less distance between the bus bars. As is evident from Fig. 4, the use of the bosses 84' gives a constant creepage distance over the surface of the underside of the base blocks 11 even though wider bus bars 13 are used for higher current ratings.

In order to provide for so connecting the circuit-breaker units to the bus bars that the connections may be readily changed without removing the pan 10 or the bases 11, special connectors are provided for connecting oppositely disposed pairs of breaker units to a bus bar 13. Thus, a connector 62 (Fig. 9) is provided for connecting a pair of breaker units to the middle bus bar and a connector 64 (Fig. 11) is provided for connecting breaker units to one or the other of the outer bus bars.

As shown, the connector 64 comprises a connector 62 and an offset member 63 (Fig. 10) which may be riveted to the member 62. The member 62 is of a U-shape with a plug-in contact blade 65 formed integrally with each leg of the U. The blade 65 is disposed at right angles to the leg of the U and it extends edgewise transversely of the bus bar 13. The blades 65 are also disposed perpendicularly to the bus bars 13. By having the flat plug contact blades extend transversely edgewise with respect to the bus bars, adjacent blades are in flatwise alignment and have sufficient flashover distance between them to be at different potentials in spite of the close spacing, which would not be the case if the plane of the contact blades was parallel to the plane of the bus bar.

The intermediate portion of the member 63 has a slot or opening 66 therein for one of the contact blades 65. As previously explained, one arm 67 may be riveted to the bight of U-member 62 and the other arm 68 may be attached to one or the other of the outer bus bars 13. The arm 68 is bent at 69 to provide an offset portion for connecting it to the bus bar. Thus, a minimum number of parts are required to provide connectors for connecting the breaker units in any desired phasing arrangement.

In the modified connector shown in Fig. 12 contact blades 71 are brazed to a U-shaped member 72. In the connector shown in Fig. 13 one leg of a U-shaped member 73 has an offset arm 74 formed integrally therewith, thereby providing a connector similar to the one shown in Fig. 11.

Figures 4, 5:
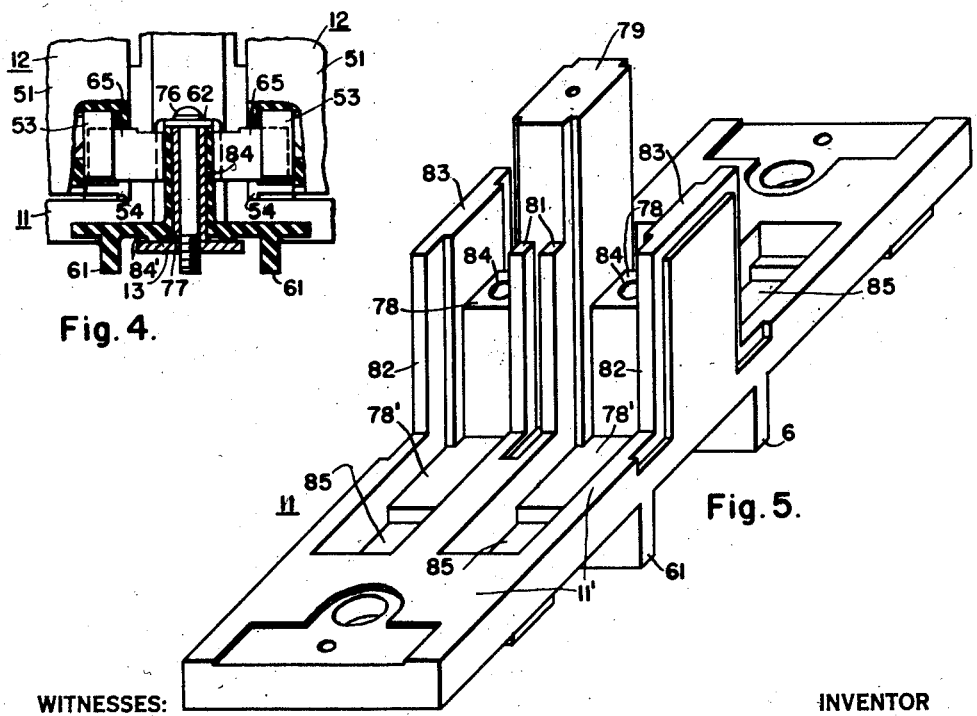
Fig. 4 is a detail view, similar to part of Fig. 2, showing the interrupter devices connected to the middle bus bar.
Fig. 5 is a view, in isometric projection, of one of the insulating bases utilized in the panelboard structure.

As shown in Figs. 1, 2 and 4, the connector 64 for the first or top pair of breaker units is connected to the left-hand bus bar, or phase A, by a screw 75. The connector to the middle bus bar, or phase B, by a longer screw 76 and a conducting spacing sleeve 77. The connector 62 for the second pair of breaker units is connected to the middle bus bar, or phase B, by a longer screw 76 and a conducting spacing sleeve 77. The connector for the third pair of breaker units is connected to the right-hand bus bar, or phase C, by a screw 75. The foregoing phase sequence may be repeated, as indicated in Fig. 1, or the sequence may be changed as desired by merely utilizing the proper connectors and screws. Such changes in sequence may be made from the front of the panel while the bases 11 remain in place on the mounting member 10, since as shown in Figs. 1, 2 and 4 the screws 75 and 76 are accessible and may be removed from the front and permit the connectors 62 and 64 to be lifted out and replaced. When only two bus bars 13 are used, the connectors will usually be connected alternately to the bus bar in one outer space and to the other bus bar which may be in either the other outer space or in the center space, but the sequence of connections to the two bus bars may be varied as may be desired to balance the load between the two sides of the line. Thus it is possible to use the same base members 11 of insulating material for single-phase panelboards having two bus bars and for three-phase panelboards having three bus bars, since the spaces on the base members for receiving the connectors 62 and 64 extend from between the barrier portions 79 and 83 at the center of the bases and outwardly in opposite directions under both rows of interrupter units and are shaped to receive connectors 64 extending to either of the two bus bars under the two rows of interrupter units so that a given pair of opposed interrupter units may be connected to either of the two outer bus bars.

In order to support the connectors 62 and 64 and to insulate adjacent connectors from each other, each base 11 has an integrally formed, transversely disposed post or other type of support having recessed portions 78 therein for the connectors and an upwardly extending barrier portion 79 which supports the cover plate 59. As shown, the post is disposed in the space between oppositely disposed breaker units 12 and the connector for each pair of breaker units is disposed in one of the recesses 78 with the bight of the inverted U-shaped member resting on top of the recessed portion of the post.

As explained hereinbefore, it is essential that a certain creepage distance be maintained between parts of different polarity. In order to increase the creepage distance between adjacent connectors, spaced ridges 81 having a groove therebetween are provided on the post between the recessed portions 78. The ridges 81 are perpendicular to the base. Thus, the creepage distance between adjacent edges of the recesses 78 is greater than the distance in air between the contact blades 65 on the connectors disposed in the recesses. Likewise, ridges 82 are provided on barrier walls 83 at the edges of the base to increase the creepage distance between connectors on adjacent bases.

The ridges 81 and 82 not only provide the necessary creepage distance over insulation between adjacent connectors 62 and 64, but act with the extensions 79 and 83 to form barriers preventing flashover through air between the wide U-shaped portions of adjacent connectors. The ridges 81 and 82 need not extend substantially beyond the wide U-shaped portions of the connectors 62 and 64, since the contact blades 65 extend edgewise from the U-shaped portions and thus have sufficient flashover distance between their adjacent flat surfaces without a barrier therebetween. When the plug-in circuit interrupter units 12 are in place the side edge portions of their ends substantially abut against the ridges 81 and 82.

In this manner the connectors can be located on one inch centers and still maintain the required creepage and air insulation distances. Circular openings 84 are provided in the post for the conducting sleeves 77 and the screws 76 for connecting the connectors to the middle bus bar. The height of the post or support at the recessed portion 78 is equal to or greater than the minimum creepage distance, thereby maintaining adequate air and creepage distances through the opening between the middle bus bar and those connectors which are connected to the outer bus bars. The base blocks 11 have molded therein grooves or depressions 78' recessed below the main surface portions 11' on which the breaker units 12 rest. The arms 68 of the connectors 64 are recessed in the depressions 78', thus permitting the connectors to extend under the circuit breakers 12 mounted on the surface portions 11' of the base blocks, as illustrated in Fig. 2. Rectangular openings 85 are provided in the base 11 at the outer ends of the grooves 78' where they connect with the two outer passages for the bus bars. Thus the openings 85 are above the outer bus bars 13 and the arms 68 of the connectors 64 extend through these openings, thereby permitting the connectors to be connected directly to the bus bars underneath the base.

While the sub-base blocks 11 of insulating material have been illustrated as having three openings for making connections to the bus bars underneath the base for each opposed pair of circuit breakers, there being one round opening 84 and two rectangular openings 85 for each pair of breakers; it is apparent that since only one of the three openings is used for connecting each pair of opposed breakers to one of the bus bars, the other two openings need not be provided. In that case, there would be one opening 85 at the left for connecting one pair of breakers to phase A, there would be one opening 84 at the center for connecting the next adjacent pair of breakers to phase B, and in the next block there would be one opening 85 at the right for connecting the following pair of breakers to phase C. The second pair of breakers on the second base block would have a connection to phase A through one opening 85 at the left, and the sequence would be repeated down the panelboard. With such an arrangement the recessed post portions 78 between the barriers 79 and 83 may be omitted and straight rather than U-shaped connectors could extend between these barriers and carry the contact blades or stabs 71. This is possible because there would then be no opening at the center of the base blocks under any connector which is at the potential of the outer bus bars. However, I prefer at present to use three openings through each base block for each opposed pair of breakers since this gives a more flexible structure in which it is possible to make changes in the field to connect any pair of breakers to any phase by merely changing connectors.

Referring to Fig. 2, it will be seen that the breaker units may be removed by removing the panel cover or trim 19 and the cover plate 59. The inner end of a breaker housing 51 may be raised to disengage the contact jaws 53 from the contact blade 65 by actuating the breaker housing 51 about the clip arm 56 as a pivot and the breaker may then be slipped out from under the arm 56 of the fastening clip 55. Thus, it is not necessary to remove the slip-off type fastening clip 55 or a connector 62 or 64 in order to remove a breaker unit. However, the panel cover or trim 19 and the cover plate 59 discourage meddlesome or unauthorized persons from removing the breaker units.

In the modification of the invention shown in Figs. 14 to 24, each base 91 supports six circuit breaker units 92. The breaker units 92 are of a different type from the units 12 and are slightly larger in size. The operating mechanism for each unit is enclosed in a housing 93 and is provided with a handle 94 for operating the circuit breaker mechanism. As shown most clearly in Fig. 15, a breaker unit may be of a type having a terminal screw 95 for connecting the breaker to a power conductor or it may be of a type having plug-in contact jaws 96 for frictionally engaging a contact blade in the manner hereinbefore described.

As shown in Fig. 21, a connector 97 having a terminal strap 98 and an arm 99 having one or more offsets may be utilized for connecting a circuit breaker unit to either one of the outer bus bars 13 when the breaker unit is provided with terminal screws 95. If it is desired to connect the breaker unit to the middle bus bar 13, the arm 99 may be omitted and the terminal strap 98 utilized for making the electrical connection.

If the circuit breaker unit is provided with the plug-in contact member 96, a connector 101 shown in Fig. 22, may be utilized for connecting the breaker unit to either one of the outer bus bars 13. As shown, the connector 101 is provided with contact blades 102 and 102' which may be engaged by the contact jaws 96. As illustrated, the connector 101 comprises two generally offset members 103 and 104 which are riveted together to form a generally U-shaped member. It will be understood that the two arms of the connector may be formed from one piece of copper or other suitable material. The blades 102 and 102' are preferably brazed to the arms 103 and 104, respectively.

A connector 105 shown in Fig. 23 may be utilized for connecting the circuit breaker units to the middle bus bar 13. The connector 105 comprises a generally U-shaped member 106 having contact blades 107 secured to outwardly extending flanges 108 on the legs of the U-shaped member 106.

Figure 15:
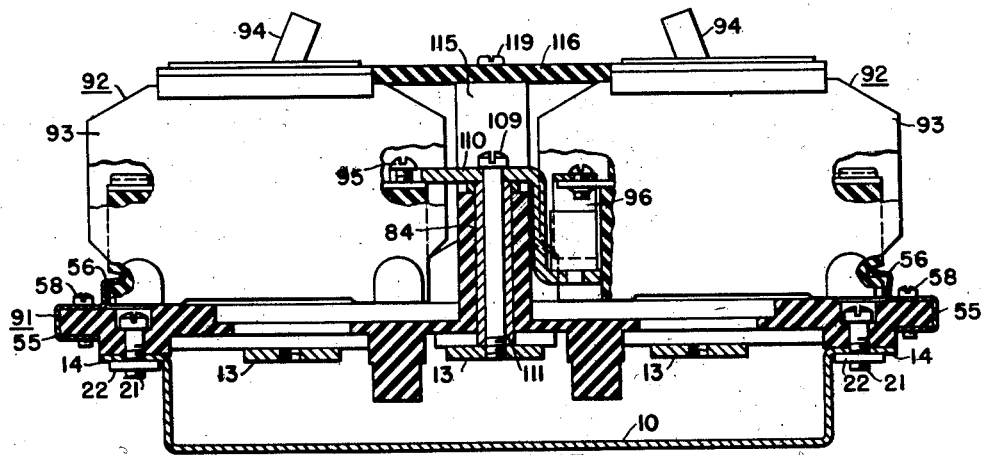
Fig. 15 is a view, partly in section and partly in elevation, the section being taken along the line XV—XV in Fig. 14.
Figure 16:
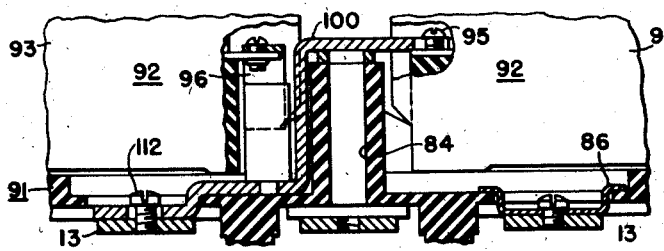
Fig. 16 is a view, similar to part of Fig. 15, taken along the line XVI—XVI in Fig. 14.

As shown in Fig. 15, a connector 110 similar to the one shown in Fig. 23 may be connected to the middle bus bar 13 by a screw 109 and a conducting sleeve 111. As shown in Fig. 16, a connector 100 similar to the ones shown in Figs. 21 and 22 may be connected to one of the outer bus bars by a screw 112.

Figure 14:
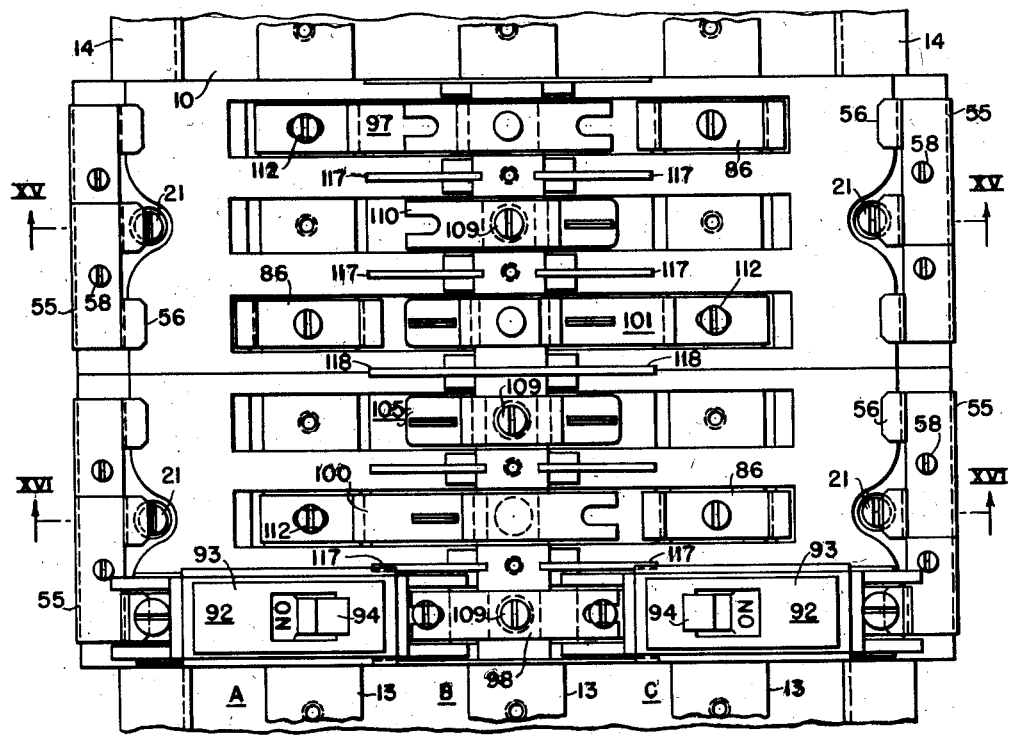
Fig. 14 is a view, in plan, of part of a modified panelboard structure.

As shown in Fig. 14, the connector at the top of the panelboard may be connected to one of the outer bus bars or phase A. The second connector may be connected to the middle bus bar or phase B and the third connector may be connected to the other outer bus bar or phase C. The other breaker units may be connected in the same phase sequence, or the sequence may be changed in order to maintain a balanced load. Thus, the next lower connector may be connected to the middle bus bar or phase B instead of to phase A. The next lower connector may be connected to phase A and the one below that connected to phase B as shown. Thus, it will be seen that the connectors may be readily connected to any one of the bus bars to provide the desired electrical connections and to mechanically support the bus bars. If desired, generally U-shaped clips 86 may be utilized in intermediate openings 85 to help support the bus bars 13.

As shown, each base 91 is provided with an integrally formed post or support 113 having recessed portions 114 for supporting the connectors. Upwardly extending portions 115 are also provided for supporting a cover plate 116, as shown in Fig. 15. The post 113 is disposed in the space between the oppositely disposed rows of circuit breaker units in the same manner as the post on the base 11, previously described. Thus, the connectors are rigidly supported and the proper air spacing and creepage distances are maintained since the post is of a sufficient height to space the connectors the required distance above the middle bus bar 13.

As shown in Fig. 14, barriers 117 (shown in detail in Fig. 24) are provided between adjacent connectors on the same base. The barriers 117 are required to properly insulate the adjacent connectors from each other since the strap portions of the connectors are not spaced sufficiently far apart to provide the proper air spacing. An additional barrier 118 may be provided between adjacent bases to insulate the connectors on the adjacent bases. The barriers 117 and 118 extend between the housings of adjacent breakers and overlap with the end portions of the side walls of the housings, so that there can be no flashover directly across between connectors of different polarity.

As shown, the sub-base blocks 91 have a circular opening 84 and two rectangular openings 85 for making connections to the bus bars underneath the base for each opposed pair of circuit breakers. As explained hereinbefore, only one of the three openings is utilized for connecting each pair of opposed breakers to one of the bus bars, the other two openings being available in case it is desired to change the breaker connections to another bus to maintain a balanced phase load. If desired, each block 91 may be provided with only three openings, one opening 85 being at the upper left for connecting one pair of breakers to phase A, one opening 84 being at the center for connecting the next adjacent pair of breakers to phase B, and one opening 85 being at the lower right for connecting the following pair of breakers to phase C. The sequence would be repeated on the next block. As previously explained, with such an arrangement straight connectors could be utilized in place of the generally U-shaped connectors since there is no opening at the center of the base blocks under a connector which is connected to one of the outer bus bars.

The cover plate 116 protects the connectors for connecting the breaker units to the bus bars and also retains the inner ends of the breaker units in position in the manner hereinbefore described. The cover plate may be retained on the post 115 by a screw 119. As previously explained, the outer ends of the breaker units are retained in position by the clips 55.

From the foregoing description, it is apparent that I have provided a panelboard which is very compact in structure and which permits the circuit interrupter units to be readily connected to any one of the phase bus bars, thereby enabling a proper division of load to be maintained. The required air spacing and creepage distances between energized parts of different polarities are maintained throughout the panelboard structure. Furthermore, the circuit interrupter units may be individually removed from the panelboard without disturbing the connections to the other units.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a panelboard, in combination, a mounting plate, one or more unitary insulating bases secured to said mounting plate, a plurality of circuit interrupter units supported on the upper side of said bases in two rows, said interrupter units having individual housings enclosing the units independently of said bases, said enclosed interrupting units being removably mounted side-by-side on top of said bases, one or more power conductors disposed between the bases and the mounting plate, said bases having transversely spaced longitudinally extending grooves at the upper side thereof under the interrupter units, all of said grooves extending equal distances in opposite directions from the center of the bases under both rows of interrupter units, connectors for connecting the interrupter units to the power conductors, some of said connectors having a portion extending a greater distance to one side of the center of the bases than the connector extends to the other side with said connectors each disposed in one of said grooves under the interrupter units, the connection between said some of the connectors and the power conductors being accessible when the interrupter units are removed, and attaching means at the ends of the bases for releasably retaining the interrupter units on the bases.

2. In a panelboard, in combination, a unitary base of insulating material secured in the panelboard, circuit interrupter spaces on said base, an upwardly extending post formed integrally with said base and disposed transversely of the base adjacent the center thereof, power conductors disposed underneath portions of the base, one or more depressions in the top of the base extending transversely of the power conductors, connectors for making connections to the power conductors, each of a plurality of said connectors having a portion disposed on top of part of said post and a portion extending laterally a greater distance on one side of the post than on the other side and positioned in one of said transversely extending depressions, said connectors each having a contact portion positioned edgewise of the post at opposite sides thereof, and said connectors cooperating with the top of said base to support one of said power conductors thereunder, and said base having an opening therethrough at one side of said post and above one of said power conductors for receiving the laterally extending part of the connector and which part engages one of the power conductors under the base.

3. In a panelboard, in combination, a mounting plate, a unitary base secured to said mounting plate, a plurality of circuit interrupter units supported on the base, said interrupter units having individual housings removably mounted side-by-side on top of said base, transversely spaced barriers formed integrally with said base and projecting upwardly between the ends of the base, power conductors disposed between the base and the mounting plate, integrally formed downwardly extending transverse ridges at the under side of the base between adjacent power conductors, connectors for connecting the interrupter units to the power conductors, each connector having a portion extending beside a barrier, said base having an opening therethrough under one of said interrupter units and above one of said power conductors and between one of said ridges and the outer edge of the base and receiving part of the connector which engages the power conductors, and said connectors cooperating with the upper side of said base to support said power conductors on the under side of the base.

4. In a panelboard, in combination, a metal box, a base of insulating material secured in said metal box, a plurality of circuit interrupter units, said interrupter units having individual housings removably mounted side-by-side along said base in two rows with an intervening space between oppositely disposed ends of said housings in the two rows, a barrier formed integrally with said base and disposed in said space between the two rows, said barrier having recessed portions in the top thereof, power conductors extending along the base, connectors in said recessed portions of the barrier for connecting the interrupter units to the power conductors, said connectors being supported by the barrier irrespective of the presence of the interrupter units, each of said connectors having two projecting contact blade portions extending beyond the barrier and positioned edgewise transversely with respect to the power conductors and providing sufficient flash-over distance therebetween even when adjacent interrupter units are removed.

5. In a panelboard, in combination, a mounting plate, a unitary base secured to said mounting plate and having surface areas for mounting a plurality of circuit interrupter units, attaching means adjacent the transversely spaced ends of the base, upwardly extending barriers formed integrally with said base, said base having recessed portions therein between said barriers, power conductors, one or more of which are disposed under the base between it and the mounting plate, one or more connectors disposed in said recessed portions under said mounting surface areas and connected to power conductors supported by the base, each connector having a contact portion disposed edgewise transversely of the power conductors, and any one of said one or more connectors extending in said recessed portions under said mounting surface areas at only one side of the panelboard.

6. In a panelboard, in combination, a plurality of unitary bases of insulating material secured in said panelboard, a plurality of circuit interrupter units having individual housings removably mounted on top of said bases in two parallel rows, each circuit interrupter unit having a contact portion adjacent its inner end and mounting means adjacent its outer end, each base having at least one opening therein underneath a row of said housings and below the central portion of the bottom of one of the housings, two adjacent bases having said openings underneath both rows of housings, power conductors disposed underneath portions of the bases and underneath said openings, the entire width of each of two of said power conductors being wholly underneath a different one of the two rows of circuit interrupter housings, connectors each having a contact portion engaged by one of the contact portions adjacent the inner ends of a pair of opposed circuit interrupter units one of which is in each of the two rows, said connectors extending laterally at the upper side of said bases and beneath the bottoms of the circuit interrupter units to said openings under the central portions of the circuit interrupter housings, and said connectors being connected to said conductors underneath the bases through said openings under the central portions of the circuit interrupter housings.

7. In a panelboard, in combination, a mounting plate, a plurality of unitary bases secured to said mounting plate, a plurality of circuit interrupter units having individual housings and plug-in terminals recessed within one of the ends of the housings, means for removably mounting the circuit interrupter units on top of said bases in two parallel rows, each base having at least one opening therein underneath a row of said interrupter housings, two adjacent bases having openings underneath both rows of interrupter housings, power conductors disposed between the bases and the mounting plate underneath said openings, said openings and said power conductors being spaced outwardly from the center of the two rows a greater distance than the plug-in terminals connectors disposed on top of the bases for connecting the interrupter units to the power conductors, each connector being connected to a conductor through one of said openings under the interrupter housings and being removable upon access to only the top of the bases, and each connector having a contact blade extending edgewise and transversely with respect to the power conductors and extending into the recess in an interrupter housing to engage the plug-in terminal therein.

8. In a panelboard, in combination, a mounting plate, a plurality of unitary bases of insulating material secured to said mounting plate, a plurality of circuit interrupter units each having an individual housing and a plug-in contact adjacent one end thereof, said interrupter units being removably mounted on top of said bases in two parallel rows with an intervening space between the two rows of housings, an upstanding portion of insulating material formed integrally with each base at the central part thereof, said upstanding portions being disposed at least in part in said space between the rows of housings and abutting the ends of the housings adjacent the side edges thereof, power conductors disposed between the bases and the mounting plate, connectors disposed on top of the bases for connecting the interrupter units to the power conductors, each connector having two contact portions for engagement with the plug-in contacts of an oppositely disposed pair of interrupter units, said upstanding portions of the bases including portions forming barriers extending between adjacent connectors, and at least some of said connectors having an arm extending under one of the interrupter units and connected to one of said power conductors thereunder.

9. In a panelboard, in combination, a plurality of unitary bases secured in the panelboard, a plurality of circuit interrupter units having individual housings removably mounted on top of said bases in two parallel rows, a slip-off fastening device securing the outer end of each interrupter unit in the panelboard, one or more barriers formed integrally with each base, said barriers projecting upwardly from the base adjacent the center thereof, three parallel conductors disposed transversely of the bases, each outer conductor being under one row of interrupter unit housings, and the center conductor being under said barriers and at the under side of the bases, connectors disposed between the barriers on the upper side of the bases for connecting the interrupter units to the conductors, each connector having portions for engagement with a pair of oppositely disposed interrupter units, some of said connectors having portions extending between the interrupter unit housings and the bases, and one or more openings through the bases to the under side thereof adjacent the inner ends of the interrupter unit housings through which some of said connectors are electrically connected to the central conductor on the under side of the bases.

10. In a panelboard, in combination, a mounting plate, a plurality of unitary bases of insulating material secured to said mounting plate, said bases being disposed in a single row, a plurality of circuit interrupter units having individual housings removably mounted on top of said bases in two parallel rows with an intervening space between the two rows of housings, parallel conductors disposed beneath the bases and between them and the mounting plate, one of said conductors being under one row of interrupter unit housings and another conductor being centered under said space between the rows of housings, connectors for connecting the conductors to the interrupter units, each connector for the center conductor having an inverted U-shaped portion disposed in said space between the rows and contact portions disposed edgewise transversely of the conductors, and each connector for the conductor under one row of unit housings comprising one of said U-shaped members with said contact portions and an offset portion attached to the U-shaped member, one end of said offset portion extending underneath an interrupter unit housing and being connected to the outer conductor.

11. In a panelboard, in combination, a mounting plate, a single row of insulating bases secured to said mounting plate, a plurality of circuit interrupter units, said interrupter units having individual housings enclosing the units separate from the insulating bases and removably mounted on top of said bases in two parallel rows, two or more parallel conductors extending transversely of the bases, two of said conductors being each under one row of interrupter unit housings, connectors mounted on the bases from the front thereof for connecting the conductors to the interrupter units, said connectors connecting opposite pairs of interrupter units in the two rows to the same conductor and connecting at least some adjacent interrupter units in the same row to different conductors, each connector having a portion disposed underneath an interrupter unit housing and an integrally formed contact blade extending edgewise transversely of the conductors, and attaching means adjacent the ends of the bases for engaging the interrupter unit housings to releasably retain them on the bases, and each interrupter unit having a member frictionally engaging a contact blade.

12. In a panelboard, in combination, a mounting plate, a single row of unitary bases removably secured to said mounting plate, a plurality of circuit interrupter units having individual housings removably mounted on top of said bases in two parallel rows with an intervening space between the two rows of housings, three parallel conductors disposed between the bases and the mounting plate, each outer conductor being under one row of unit housings and the center conductor being under said space between the rows of housings, connectors for connecting the conductors to the interrupter units, each connector for the center conductor being a U-shaped member with integrally formed contact blades extending laterally from the legs of the U, each connector for the outer conductors comprising one of said U-shaped members and a member having two offset arms and an intermediate portion with a slot therein for receiving one of the contact blades of the U-shaped member, and said member having the offset arms including an arm which extends underneath an interrupter unit housing and is connected to one of the outer conductors.

13. A connector for connecting a panelboard bus bar to circuit interrupter units of the plug-in type, said connector comprising a U-shaped member having a contact portion disposed substantially at right angles to each leg of the U, an offset member having a slot therein for receiving one of said contact portions, one offset arm of the member being connected to the bight of the U, and another offset arm of the member having a hole therethrough.

14. A connector for interconnecting a panel-board bus bar and circuit interrupter units of the plug-in type, said connector comprising a U-shaped member having a contact blade formed integrally with each leg of the U at the outside of the U and disposed edgewise substantially at right angles to both the leg of the U and to a plane tangent to the bight of the U, said U-shaped member having an opening through the bight of the U.

15. In a panelboard, in combination, a unitary base secured in said panelboard, a plurality of circuit interrupter units supported by said base, said interrupter units having individual housings removably mounted side-by-side on top of said base with an intervening space between oppositely disposed ends of said housings, a barrier formed integrally with said base and disposed transversely of the base in said space, said barrier having recessed portions therein, power conductors disposed underneath the base, connectors disposed in said recessed portions for connecting the interrupter units to the power conductors, each connector having a U-shaped portion with a contact blade disposed substantially at right angles to each leg of the U, said contact blades being in planes perpendicular to the plane of the power conductors and extending transversely of the conductors beyond the edges of said barrier for engagement by the interrupter units, and each interrupter unit having a contact member recessed in its housing, said housing having a slot in one corner permitting the engagement of one of said contact blades by the contact member therein.

16. A unitary base for supporting a plurality of circuit interrupter units in side-by-side relation, an integrally formed perpendicularly extending upstanding portion disposed transversely of the base substantially midway between the ends of the base, said upstanding portion having a pair of spaced recesses extending thereacross with a partition therebetween, one or more ridges on the opposite edges of said partition, main mounting surface portions on the upper side of the base, depressed portions extending outwardly from each side of said upstanding portion below the level of each of said mounting surface portions on the upper side of the base generally centrally of each of the mounting surface portions, and one or more openings through the base from said depressed portions to the other side thereof.

17. In a panelboard, in combination, a mounting plate, a single row of unitary bases secured to said plate for supporting a plurality of circuit interrupter units, said interrupter units having individual housings removably mounted on top of said bases in two parallel rows, power conductors and connectors for connecting the power conductors to the interrupter units, a neutral bar disposed at one end of and insulated from said power conductors, an upstanding bracket attached to and insulated from said mounting plate, a terminal lug for connecting a neutral conductor to the neutral bar, a single bolt for attaching the lug to the neutral bar and the neutral bar to the bracket, said bracket having a hole therein, and a projection on the neutral bar disposed in said hole to prevent the neutral bar from turning on the bracket about said bolt.

18. In an electrical distribution device, in combination, a metal box, a base of insulating material secured in said box, a plurality of circuit interrupter units, said interrupter units having individual housings removably mounted side-by-side in two rows with their bottom surfaces in engagement with a surface of said base and with an intervening space between oppositely disposed ends of the housings in the two rows, said space between the two rows being narrow compared with the length of the individual housings, a barrier formed integrally with said base and disposed in said space between the two rows, said barrier having recessed portions in top thereof, power conductors extending along the base, connectors in said recessed portions in the top of the barrier, each of said connectors having two contact blades extending laterally on opposite sides of and projecting beyond the barrier and positioned edgewise transversely with respect to the power conductors, each of said interrupter units having a plug-in contact within its housing at the inner lower corner thereof and having a slot in its housing through which one of said projecting contact blades extends into the interrupter housing to engage the plug-in contact, and each of said connectors being connected to one of said power conductors so that opposite interrupter units are connected to the same power conductor.

19. In an electrical distribution device, in combination, a metal box, a base of insulating material secured in said box, a plurality of circuit interrupter units, said interrupter units having individual housings removably mounted side-by-side in two rows with their bottom surfaces in engagement with a surface of said base and with an intervening space between oppositely disposed ends of the housings in the two rows, a barrier formed integrally with said base and disposed in said space between the two rows, said barrier having recessed portions in the top thereof, power conductors extending along the base, connectors in said recessed portions in the top of the barrier, each of said connectors having two projecting flat contact blades extending laterally on opposite sides of the barrier and positioned edgewise transversely with respect to the power conductors, each of said interrupter units having a plug-in contact within its housing at the inner lower corner thereof and having a slot in its housing through which one of said projecting contact blades extends into the interrupter housing to engage the plug-in contact, each of said connectors being connected to one of said power conductors so that opposite interrupter units are connected to the same power conductor, and adjacent connectors being connected alternately to different ones of said power conductors so that adjacent interrupter units are of different polarity and having their blade portions exposed flatwise to each other when the interrupter units are removed.

20. In an electrical distribution device, a member of insulating material having an integral upstanding central portion and an integral laterally extending lower portion on each side thereof, a plurality of circuit breaker units having individual housings removably mounted in two rows with their inner ends substantially abutting the upstanding central portion of the insulating member and with their bottoms at their inner ends resting on the laterally extending portions of the insulating member, power conductors extending along the insulating member, connectors extending across said upstanding central portion of the insulating member, each of said connectors being connected to one of said power conductors, and each of said connectors having two projecting laterally exposed contact blade portions positioned on opposite sides of the upstanding central portion of the insulating member and positioned edgewise transversely with respect to the power conductors, and each of said circuit breaker units having a plug-in contact positioned entirely within its housing at the inner lower corner thereof and having a slot in its housing through which extends one of said projecting contact blade portions to engage the plug-in contact therein.

21. In a panelboard, a plurality of rigid base members of molded insulating material arranged in a single row, a plurality of power conducting bars supported by and extending along the row of base members, a plurality of circuit interrupter units positioned side-by-side on said base members in two rows, said base members each having a length substantially as great as the over-all width of the two rows of interrupter units and having main mounting surfaces engaging and supporting the bottoms of the interrupter units near the oposite ends thereof, said interrupter units being individually housed with a plug-in contact in each interrupter housing at the lower inner corner thereof with a slot in both the inner end wall and the bottom wall of the housing at the lower inner corner to permit access to the plug-in contact, a recess in the outer end wall of each interrupter housing near the bottom thereof, a plurality of inwardly extending projections spaced along the outer end portions of the base members, said projections extending into the recesses in the outer end walls of the interrupter housings and forming the sole means for securing the outer ends of the interrupter units to the base members, said base members having at the upper side thereof one or more grooves extending longitudinally thereof from under one row of interrupter units toward the center thereof, one or more connectors lying in said grooves, said connectors being each connected at its outer end to one of the power conducting bars at a point under one row of interrupter units, said connectors having flat blade portions electrically connected thereto adjacent the inner ends thereof, the flat faces of which blade portions extend transversely of the length of the power conducting bars, and said flat blade portions extending into the slots in the end and bottom walls of the interrupter units to frictionally engage the plug-in contact at the lower inner corner thereof.

22. In a panelboard, a plurality of rigid base members of molded insulating material arranged in a single row, three power conducting bars of a three-phase circuit supported by and extending along the single row of base members, a plurality of single-pole circuit interrupter units positioned side-by-side along said base members in two rows, one of said power conducting bars extending along the underside of the single row of base members substantially along the center of the row and the inner ends of the interrupter units in the two rows being positioned substantially over the center power conducting bar and the two other power conducting bars being each positioned under one of the rows of interrupter units, said single-pole interrupter units being individually housed with a plug-in contact adjacent the inner end of each housing, a plurality of slip-off type holding means adjacent the outer ends of each row of interrupter units and means at the outer end of each single-pole interrupter unit housing engageable by one of the slip-off type holding means, said base members having at the upper side thereof one or more recessed portions extending from under one row of interrupter units toward the center thereof and also having at least one opening at the center thereof extending through to the underside thereof, a plurality of connectors, some of which lie in said recessed portions of said base members and are connected at one end to one or the other of the two power conducting bars under the two rows of interrupter units and the other of which are connected through said openings at the center of the base members to the power conducting bar under the center of the row of base members, a plug-in contact portion on each of said connectors engaging the plug-in contact at the inner end of one of the single-pole interrupter units, and at least one group of three adjacent connectors being connected in sequence to the three power conducting bars for the three phases so that the three adjacent single-pole interrupter units plugged in thereon are each connected to a different phase conductor.

23. A connector for connecting a panelboard bus bar to circuit interrupter units of the plug-in type, said connector comprising a U-shaped part having two contact portions each positioned outside of the U adjacent one of the legs thereof and each disposed substantially at right angles to one leg of the U and also at right angles to a plane tangent to the bight of the U, and an arm extending in a direction laterally away from one leg of the U, said arm having an apertured terminal portion lying in a plane passing in front of the open end of the U.

24. In a panelboard, a plurality of base members of molded insulating material arranged in a row, a plurality of power conducting bars extending along the length of the row of base members, a plurality of circuit interrupter units positioned side-by-side over said base members in two opposed rows, two of said power conducting bars being each positioned with its entire width under a different one of the two rows of interrupter units, said interrupter units being individually housed with a plug-in contact adjacent the inner end of each housing, slip-off fastening means adjacent the outer end of each housing detachably securing the outer end of each interrupter unit in the panelboard, a plurality of connectors each having contact portions adjacent the inner ends of an opposed pair of interrupter unit housings and frictionally engaged by the plug-in contacts of the two interrupter units of the pair, a plurality of said connectors each having a portion extending laterally and outwardly beyond said contact portions at the upper side of one of the base members and under the bottom of one of the pair of interrupter units with the outer end portion of the connector connected to the power conducting bar under the said interrupter unit, said base members having at the upper side thereof a plurality of spaces in which said connectors are positioned, a plurality of said spaces each extending in opposite directions to the power conducting bars under both of the interrupter units of one of said pairs and being shaped to receive a connector extending under either of the interrupter units of said pair whereby said connectors may be placed in each of a plurality of said spaces to extend outwardly in either direction and connect an opposed pair of interrupter units to either of said power conducting bars.

25. In a panelboard, a plurality of base members of molded insulating material arranged in a row, a plurality of power conducting bars extending along the length of the row of base members, a plurality of circuit interrupter units positioned side-by-side over said base members in two opposed rows, two of said power conducting bars being each positioned under a different one of the two rows of interrupter units, said interrupter units being individually housed with a plug-in contact adjacent the inner end of each housing, fastening means adjacent the outer end of each housing detachably securing the outer end of each interrupter unit in the panelboard, a plurality of connectors each having contact portions adjacent the inner ends of an opposed pair of interrupter unit housings and frictionally engaged by the plug-in contacts of the two interrupter units of the pair, a plurality of said connectors each having a portion extending laterally at the upper side of one of the base members and under the bottom of one of the pair of interrupter units with the outer end portion of the connector connected to the power conducting bar under the said interrupter unit, said base members having at the upper side thereof a plurality of spaces in which said connectors are positioned, a plurality of said spaces each extending in opposite directions to the power conducting bars under both of the interrupter units of one of said pairs and being shaped to receive a connector extending under either of the interrupter units of said pair whereby said connectors may be placed in each of a plurality of said spaces to extend outwardly in either direction and connect an opposed pair of interrupter units to either of said power conducting bars, at least some of said connectors which are next to each other being connected to different ones of said power conducting bars and being spaced from each other on centers having a distance therebetween of one inch or less and which distance is less than the distance required for electrical creepage over insulation for the voltage rating of the panelboard, and said base members having formations thereon between said connectors increasing the electrical creepage distance over the surface of the insulating material of the base members to a distance greater than the said distance between the centers of the connectors.

26. In a panelboard, in combination, a plurality of unitary bases secured in the panelboard, a plurality of circuit interrupter units having individual housings removably mounted on top of said bases in two parallel rows, one or more barriers formed integrally with each base, said barriers projecting upwardly from the base adjacent the center thereof, three parallel conductors disposed transversely of the bases, each outer conductor being under one row of interrupter unit housings, and the center conductor being under said barriers and at the under side of the bases, connectors disposed in the spaces between the barriers on the upper side of the bases for connecting the interrupter units to the conductors, each connector having portions for engagement with a pair of oppositely disposed interrupter units, some of said connectors having portions extending outwardly beyond said engagement portions and between the interrupter unit housings and the bases and being connected at their outer ends to one of the outer conductors under the row of interrupter unit housings, one or more openings through the bases to the under side thereof adjacent the inner ends of the interrupter unit housings through which some of said connectors are electrically connected to the central conductor on the under side of the bases, and each of the spaces having therein a connector which is connected to one of the outer conductors, extending to both sides of the center of the base to both of the outer conductors and being shaped to receive a connector connected to either of said outer conductors.

27. In a panelboard, in combination, a mounting plate, a single row of insulating bases secured to said mounting plate, a plurality of circuit interrupter units, said interrupter units having individual housings removably mounted on top of said bases in two parallel rows, said individual housings enclosing the interrupter units when removed from the insulating bases, two or more parallel conductors extending transversely of the bases, two of said conductors being each positioned with its entire width under one row of interrupter unit housings, connectors for connecting the conductors to the interrupter units, each connector having a portion disposed underneath an interrupter unit housing and at the upper side of one of the bases and being supported thereby, said connectors having plug-in contact blade means with flat side faces extending edgewise transversely of the conductors, and attaching means adjacent the ends of the bases for engaging the interrupter unit housings with a slip-off connection to releasably retain them on the bases, and each interrupter unit having a plug-in contact member frictionally engaging one of said plug-in contact blade means supported on the bases.

28. Means for mounting two rows of circuit breakers upon a panelboard comprising fixedly mounted buttress members disposed in spaced relationship, a plurality of circuit breakers each having an insulated housing including spaced abutments thereon which are adjacent to the opposite ends of said housing, said abutments engageable respectively with said buttress members in abutting relationship therewith to hold said circuit breaker against endwise movement in either direction, one of said buttress members comprising a slip-off fastening means also normally restraining one end of the circuit breaker against movement in a direction out from the panelboard, said plurality of circuit breakers including three or more circuit breakers positioned side-by-side in each of two rows with an intervening space between the opposed ends of the circuit breakers in the two rows, insulating material in said intervening space between the two rows of circuit breakers, a plurality of line terminal members positioned at one end of the rows of circuit breakers, contact means on said panelboard having their greatest areas of contact surface lying in planes extending endwise of the circuit breakers, said contact means on the panelboard including three or more contact means positioned side-by-side in each row and electrically connected alternately to different ones of said plurality of line terminal members at the end of the rows so that adjacent contact members are of different polarity, and contact means on each said circuit breaker independent of said abutments initially engageable with the contact means on said panelboard when said circuit breaker is being moved toward said abutting relationship, the latter named contact means effective to guide and align said circuit breaker during said movement and to establish electrical connection between the respective contacts before the circuit breaker housing is in place to be held against endwise movement by the engagement of the abutments with the buttress members and said contact means on the circuit breakers having their greatest areas of contact surface lying in planes extending endwise of the circuit breakers.

29. Means for mounting a plurality of circuit breakers upon a panelboard comprising opposed fixedly mounted buttress members disposed in spaced relationship, a plurality of circuit breakers each having an insulated housing including spaced abutments thereon at the opposite ends of said housing, said abutments engageable respectively with said opposed buttress members in abutting relationship therewith to hold said circuit breaker against endwise movement in either direction independently of any other circuit breaker and independently of the contact means on the panelboard hereinafter set forth, said plurality of circuit breakers including three or more circuit breakers positioned side-by-side in a row, contact means on said panelboard positioned edgewise with respect to the panelboard and having their greatest areas of contact surface lying in planes extending endwise of the circuit breakers, said contact means positioned edgewise on the panelboard including three or more contact means positioned side-by-side in a row, and contact means on each said circuit breaker independent of said abutments initially engageable with the contact means on said panelboard when said circuit breaker is being moved toward said abutting relationship, the latter named contact means effective to guide and align said circuit breaker during said movement and to establish electrical connection between the respective contacts before the circuit breaker housing is in its final position between the buttress members, and said contact means on the circuit breakers having their greatest areas of contact surface lying in planes extending endwise of the circuit breakers, a plurality of line terminal members on the panelboard, and said contact means positioned edgewise on the panelboard in a row being connected respectively in sequence to different ones of said plurality of line terminal members.

30. Means for mounting a plurality of rows of circuit breakers upon a panelboard comprising buttress means adjacent the center of the panelboard and outer buttress members disposed on opposite sides of said central buttress means and in spaced relationship therewith, a plurality of circuit breakers each having an insulated housing including spaced abutments thereon which are adjacent to the opposite ends of said housing, said circuit breakers being mounted in two rows with said abutments engageable respectively with said central buttress means and one of said outer buttress members in abutting relationship therewith to hold said circuit breakers in each row against endwise movement in either direction independently of the circuit breakers in the other row, said two rows of circuit breakers having an intervening space between the oppositely disposed ends of the housings in the two rows, means of insulating material adjacent the center of the panelboard and including insulating material extending laterally under the inner ends of the circuit breakers of each row and also upwardly between the lower end portions of the circuit breakers in the two rows, a plurality of line terminal members positioned at one end of the two rows of circuit breakers, contact means on said panelboard each having blade portions on opposite sides of the center of the panelboard, said blade portions being positioned edgewise and perpendicular to the back of the panelboard with three or more of said blade portions on each side of the center of the panelboard, said contact means on the panelboard having conducting portions extending across said insulating material extending upwardly between the lower end portions of the circuit breakers so that a pair of opposite circuit breakers connected to said contact means will be electrically at the same potential, said contact means on the panelboard being electrically connected respectively in sequence to said plurality of line terminal members at the end of the two rows of circuit breakers so that adjacent circuit breakers connected to said contact means on one side of the panelboard are connected to different line terminal members, and contact means on said circuit breakers independent of said abutments initially engageable with the contact means on said panelboard when each said circuit breaker is being moved toward said abutting relationship, the latter named contact means effective to guide and align said circuit breaker during said movement and to establish electrical connection between the respective contacts before the circuit breaker housing is in its final position between the central buttress means and one of the outer buttress members.

31. In a panelboard, in combination, a mounting plate, means of insulating material secured to said mounting plate, a plurality of circuit interrupter units supported at the upper side of said mounting plate in two rows with a relatively narrow intervening space between the inner ends of oppositely disposed interrupter units in the two rows, said interrupter units having individual housings enclosing the units independently of said means of insulating material secured to the mounting plate, slip-off fastening means for removably securing the outer ends of the interrupter units, said means of insulating material having portions extending upwardly from the mounting plate adjacent the center of the panelboard and into the space between the inner ends of the oppositely disposed interrupter units in the two rows, power conductors extending along the rows of interrupter units, a plurality of connectors for electrically connecting the interrupter units to the power conductors, some of said connectors extending from one of said power conductors upwardly along one side of said upwardly extending means of insulating material and other of said connectors extending from another of said power conductors upwardly along the other side of said upwardly extending means of insulating material, each of the aforesaid connectors having a portion extending across the top of a portion of said upwardly extending means of insulating material and having a contact portion on each side of the center of the panelboard for connecting an opposed pair of said interrupter units to the same one of the power conductors, each said contact portion at each side of the center of the panelboard being positioned edgewise transversely with respect to the power conductors, said connectors being mounted in fixed position on the panelboard independently of the circuit interrupter units and the inner ends of said circuit interrupter units being movable in a directon forwardly from the mounting plate while the connectors are mounted in fixed position in the panelboard, a plug-in contact adjacent the inner end of each circuit interrupter unit engageable with one of said edgewise contact portions of the connectors by movement in a direction toward the mounting plate, and a wire terminal on each circuit interrupter unit adjacent the outer end thereof.

32. In a panelboard, in combination, a mounting plate, means of insulating material secured to said mounting plate, a plurality of circuit interrupter units positioned in two rows with at least the inner ends of the interrupter units in each row on said means of insulating material, said interrupter units having individual housings enclosing each interrupter independently of said means of insulating material and being removably mounted in the two rows with an intervening space between the oppositely disposed inner ends of said housings, said space being much narrower than the length of the individual housings of the interrupter units, slip-off fastening means removably securing the outer ends of the interrupter units, said means of insulating material having portions extending upwardly from the mounting plate adjacent the center of the panelboard into the space between the inner ends of the oppositely disposed inner ends of the interrupter units in the two rows, said upwardly extending portions of insulating material having a maximum width much less than the length of the individual housings of the interrupter units, power conductors extending along the rows of interrupter units, a plurality of connectors for electrically connecting the interrupter units to the power conductors, some of said connectors extending from one of said power conductors upwardly along one side of portions of said upwardly extending insulating material and other of said connectors extending from another of said power conductors upwardly along the other side of said upwardly extending portions of insulating material, the aforesaid connectors having a portion extending across the top of said upwardly extending portions of insulating material and having a contact portion on each side of the center of the panelboard and connecting an opposed pair of said interrupter units to the same one of the power conductors, at least some of said connectors which are next to each other being connected to different ones of said power conductors, each said contact portion at each side of the center of the panelboard having flat side faces in planes perpendicular to the length of the power conductors, said connectors being mounted in position on the panelboard irrespective of the presence of the interrupter units and the inner ends of the interrupter units being movable in a direction forwardly from the mounting plate while the connectors are fixed in position in the panelboard, and a plug-in contact adjacent the inner end of each interrupter unit having opposed contact surfaces biased to engage the flat side faces of one of the contact portions of the connectors.

33. A unitary base of insulating material having main surface portions thereon for receiving a plurality of circuit interrupter units, said base including at least three transversely spaced integrally formed portions extending longitudinally of the upper side of the base and providing therebetween two or more depressed portions extending longitudinally side by side at the upper side of the base and depressed below the main surface portions, all of said longitudinally extending depressed portions extending substantially equal distances to both sides of the center of the base, two or more passages extending transversely of the base and across the width thereof, one of said transversely extending passages connecting with each one of the longitudinally extending depressed portions adjacent the outer ends thereof at one side of the center of the base, and another of said transversely extending passages connecting with each one of the longitudinally extending depressed portions adjacent the outer ends thereof at the other side of the center of the base.

34. A unitary base of insulating material having main surface portions thereon for receiving a plurality of circuit interrupter units, said base including at least three transversely spaced integrally formed portions extending longitudinally of the upper side of the base and providing therebetween two or more depressed portions extending longitudinally side by side at the upper side of the base and depressed below the main surface portions, all of said longitudinally extending depressed portions extending substantially equal distances to both sides of the center of the base, three passages extending transversely of the base and across the width thereof, two of said transversely extending passages being spaced outwardly from the center of the base and each connecting with each of the longitudinally extending depressed portions, the third transversely extending passage extending along the central portion of the base at the under side thereof, and one or more openings through the base from the upper side thereof to said third transversely extending passage at the central portion of the underside of the base.

35. A unitary base of insulating material having main surface portions thereon for receiving a plurality of circuit interrupter units, said base including at least three transversely spaced integrally formed portions extending longitudinally of the upper side of the base and providing therebetween two or more depressed portions extending longitudinally side by side at the upper side of the base and depressed below the main surface portions, all of said longitudinally extending depressed portions extending outwardly from the central portion of the base to both sides thereof, two spaced ridges projecting downwardly at the under side of the base and extending transversely thereacross, said spaced ridges forming three passages extending transversely across the under side of the base with one passage between the two ridges and each of the others at the opposite outer sides of the ridges, said longitudinally extending depressed portions at the upper side of the base each extending outwardly at each side of the center of the base to a position over one of the two outer passages and being connected thereto through the base, and one or more bosses projecting downwardly in one or more of the transversely extending passages at the under side of the base.

References Cited in the file of this patent

UNITED STATES PATENTS

| 1,624,595 | Haddock | Apr. 12, 1927 |
| 1,756,878 | Potter | Apr. 29, 1930 |
| 1,872,296 | Jennings | Aug. 16, 1932 |
| 1,902,790 | Starrett | Mar. 21, 1933 |
| 1,938,309 | Williams | Dec. 5, 1933 |
| 2,007,174 | Benjamin | July 9, 1935 |
| 2,199,626 | Freese | May 7, 1940 |
| 2,282,520 | Jackson | May 12, 1942 |
| 2,351,942 | Dyer | June 20, 1944 |
| 2,397,102 | Graham | Mar. 26, 1946 |
| 2,517,992 | Erickson | Aug. 8, 1950 |
| 2,567,962 | O'Brien | Sept. 18, 1951 |
| 2,599,695 | Christensen | June 10, 1952 |
| 2,621,227 | McMahon | Dec. 9, 1952 |
| 2,647,225 | Cole | July 28, 1953 |

OTHER REFERENCES

NLTQ Panelboards, Bulletin TEB-14 by Trumbull Electric Mfg. Co., April 23, 1951. Copy in Div. 48—317-119.